Aug. 29, 1933. O. SEVERSON 1,924,887
INSERTED CUTTING BLADE LOCK
Filed March 29, 1927
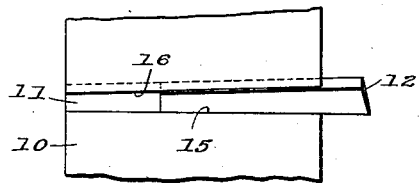
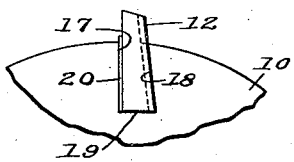
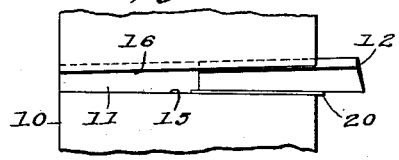
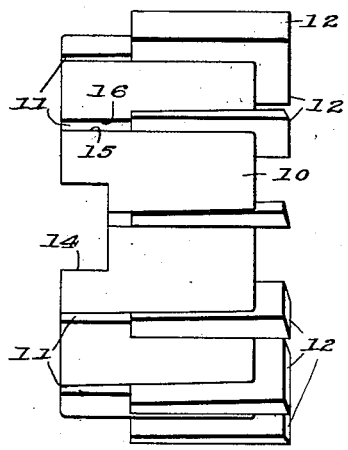
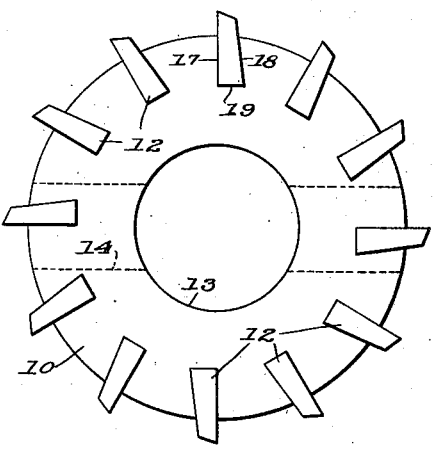
Inventor
Ole Severson
By Attorney
Nathan & Bowman Patented Aug. 29, 1933

1,924,887

UNITED STATES PATENT OFFICE 1,924,887

INSERTED CUTTING BLADE LOCK

Ole Severson, Shelton, Conn., assignor to The O. K. Tool Company, Inc., New York, N. Y., a corporation of New York Application March 29, 1927. Serial No. 179,212

4 Claims. (Cl. 29—105)

This invention relates to cutting tools adapted to be used in various manners such as woodworking and metal-cutting and in view of certain rigid and compact structural features thereof is particularly adapted to be used in the art of metal-cutting, such as a rotary cutter of a milling machine.

It is well known that the efficiency of the modern machine tool is largely dependent upon the qualities of the working tool used thereon. Accordingly, any improvements in cutting tools of this type are of great importance and have considerable influence on the art of machine-tool operation.

In view of the extreme amount of wear to which tools of this type are subjected it has been found practical to make the cutting blades removable from the main supporting structure upon which they are carried. The blades, by being thus removable, may be replaced by new blades or may be re-sharpened in an adjusted position to maintain the original overall dimension of the cutting tool. Also by making the blades separate from the supporting body member the materials may be economically and efficiently used in accordance with the functions to be performed by the various elements of the cutting-tool. The modern rotary cutting tool of the type disclosed herein ordinarily includes a body portion made of mild steel, which is strong and tough and comparatively inexpensive. The inserted teeth, however, are of an entirely different material and are designed to resist the wear and strains to which they are subjected by being brought into contact with the part to be machined. Such blades are, therefore, usually made of what is known as "high speed steel" and the material therein is much more expensive than the material in the body portion.

Tools of this type are required to operate and to leave finished surfaces of extreme accuracy and the quality of work performed is, therefore, dependent to a very large extent upon the structural qualities of the cutting tool itself, and particularly upon its rigidity and upon the accuracy with which the blades may be maintained in their fixed position on the supporting member. It is one of the objects of this invention to provide means for assembling a cutting tool of this type which will be more rigid and compact and wherein the blades will be positively locked in the body-member in such a manner as to positively prevent any movement of the blades therein after they have been once adjusted and sharpened in position.

Owing to the importance of these characteristics in cutting tools, this art has been given a great amount of study by men skilled in the art and a great many devices have been discovered and improved upon for securely locking the blades in the body-member and for positively maintaining such position. Such means have included various locking elements, such as pins, set screws, and keys; the keys perhaps being the device best adapted heretofore to such functions.

It is an object of this invention to eliminate these various locking devices in a rotary cutting tool of this type, the construction consisting of a supporting-member which is the main rotary element having definitely shaped slots in the periphery therein adapted to receive the cutting-blade, the slot and the blade being of such shape as to make the blade self-locking in the supporting-member. The construction is thereby very much simplified and is made more rigid and compact.

By the elimination of the various fastening devices, such as keys, accuracy of the tool is not affected by the uniformity of the size of locking keys or such fastening means and the machining and assembly required in the construction of such cutting tools is very much reduced.

It has been found that the more nearly solid and more rigid these cutting tools can be made, the less liability there will be for the tool to chatter and cause uneven surfaces upon the part to be machined. The blades and the construction herein disclosed provide means for locking the tool against radial movement by making the surface of such a shape as to form a dovetail lock for the blade. The blade and opening are made wedge-shaped in a longitudinal direction and therefore the normal force acting on such tool will tend to wedge the tool into tighter engagement with the supporting surface and each tapered dimension will operate to tighten the tool in the opposite direction, thereby providing an interlocking means between the two possible movements of the blades. The blade being in immediate contact with the adjacent portions of the supporting member itself is not subjected to becoming loosened by any inaccuracies or defects of any kind of locking keys which heretofore have constituted one of the chief means of locking such blades in the body portion of the cutting tool.

It is one of the objects of this invention, in combination with the advantages outlined above, to manufacture such a cutting-tool of fewer parts since the only elements involved are the supporting body member and the blades inserted therein.

It is another object of this invention to provide also, in combination with the above features, means for adjusting the tool longitudinally in its slot to thereby re-position it to compensate for any wear on the tool and to provide new surfaces which may be ground simultaneously with the remaining tools to thereby allow for re-sharpening the tool to its original dimensions. This adjusting means is accomplished by the insertion of shims in the tapered openings which results in advancing the tool without sacrificing any of the advantages of rigidity and self-locking stated above.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawing depicting a preferred typical construction has been annexed as a part of this disclosure, and, in such drawing, like characters of reference denote corresponding parts throughout all the views, of which:

Figure 1 is a side view in elevation of a rotary cutter showing the cutting blades assembled therein. Fig. 2 is an end elevation thereof looking from the right in Fig. 1. Fig. 3 is an enlarged portion of the cutter of Fig. 1 showing more clearly the manner of assembling the blade therein. Fig. 4 is a view, similar to Fig. 3 but showing shim means for advancing the tool to provide adjustment thereof, and Fig. 5 is a view, similar to Fig. 4, looking from the right thereof.

The invention is shown incorporated in a milling cutter. It is to be understood, however, that such invention is not limited to the particular type of cutter shown herein. Such cutter comprises a main body or supporting member 10 having a series of slotted openings or grooves 11 extending in the periphery thereof and having a corresponding series of blades 12 inserted in such openings. The body member 10 is provided with a central opening 13 to accommodate the supporting shaft and the inner or rear face of the body-member is provided with a rectangular shaped opening 14 which permits the insertion of a correspondingly shaped member for driving the cutter.

As most clearly shown in Figs. 3 and 4 the openings 11 are tapered, such openings decreasing in size as they progress from the outer to the inner end thereof. The blades 12, as may be seen, are tapered in a similar manner; the included angle between the sides of the blade being the same as that of the included angle between the adjacent sides of the opening 11 whereby the blade, when fully inserted therein, is brought into a close engagement with the supporting surface at all points thereof. As shown herein, the openings and blades extend longitudinally in the periphery of the supporting member with the one side 15 substantially parallel to the axis of the cutter; the opposite side 16 being inclined with respect thereto to provide the tapered opening described. It is to be understood, however, that these slots or grooves 11 need not extend parallel to the axis of such cutter but may be inclined at an angle thereof if desired and as is often customary in manufacturing cutters of this or similar types.

As shown in Figs. 2 and 5, the opening is also inclined radially, the blade 12 also being inclined to correspond therewith, the opening and blades being inclined in such manner that the size of the opening increases towards the axis of the cutter. As shown herein, the side 17 of the opening lies on a radius of the cutter while the side 18 is inclined to a radius to form a tapered opening, such being the usual structure in cutters of this type; it being understood, however, if desired, the surface 17 may be inclined to the radius. The means disclosed provides a dovetail for positively locking the blade against a radial movement. Normally the inner edge of the blade rests firmly against the surface 19 and when the blade 12 is slid along to be wedged in the groove such blade is thereby maintained in firm engagement with the surface 19. It may be seen that any tendency to force the blade further along in the groove serves to more firmly hold the blade in engagement with the surface 19 and likewise any tendency of the blade 12 to move radially simultaneously tends to more firmly lock the blade against longitudinal movement. A very positive interlocking means against movement in any direction is therefore provided.

The structure disclosed herein provides a very solid compact cutter of few parts, which is independent of any fastening means such as keys inserted alongside the blade or any of the other various means resorted to for firmly holding the blades in the assembled position. By causing the blades to engage directly with the adjacent surface of the body-member 10 a much more solid construction is arrived at and one which is entirely independent of inaccurate machined keys or grooves therefor, or of any inaccurate or loose assembling of the keys in conjunction with the respective blades.

The very rigid construction disclosed herein results in a cutter which is practically free from vibration or chatter, such as would be caused by an even slightly loosened blade or one which has not been accurately assembled. In view of the extreme accuracy and precision with which such tools must operate even in the face of the severe strains to which such tools are subjected this rigid construction forms one of the important features of this invention. At the same time and in conjunction with such advantages, a tool has also been provided which comprises few parts and therefore requires fewer machine operations and is much more easily, quickly and accurately assembled.

Means have also been provided, in combination with the novel features, above outlined, of readjusting the blade in the slot to provide for wear at the end of the blade. Such means comprises a shim 20 insertable in the opening 11 adjacent the blade. Such shim is made of full dimensions, that is, it is made equal in area at least to the adjacent wall of the opening in order to provide a complete bearing surface for the blade and in order that the rigidity of the tool as a whole may not be impaired by the insertion of such adjusting means. One or more shims may be used or shims of various thicknesses in accordance with the desired adjustment. It is thus seen that when the tool has become worn at its outer end it may be moved longitudinally outwardly and then accurately ground in its re-adjusted posiiton. The shim may be placed at either side of the blade as desired.

Without further analysis, the foregoing will so fully reveal the gist of this invention, that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A rotary cutting tool comprising a body member having a series of slotted openings in the periphery thereof, the opposite walls of said openings being inclined toward each other both longitudinally thereof and radially of said member, whereby compound wedge-shaped openings are provided with the larger dimensions extending toward the outer end and toward the axis of said member; and blades inserted in the openings having a shape and size to correspond with the openings whereby adjacent portions of said body member directly engage the blade to form a dovetail locking means against radial movement of said blades and also form a wedge for frictional engagement with said blades to prevent longitudinal movement thereof said blades being thereby secured in place independently of auxiliary fastening devices.

2. A rotary cutting tool comprising a single piece cylindrical body member adapted to be driven from the inner end thereof and having a series of slotted openings in the periphery thereof; blades inserted in said openings and extending therefrom, said openings and blades being tapered radially and longitudinally of the tool with the openings increasing in size toward the axis and outer end of the tool whereby said blades are dovetailed therein radially and wedged therein longitudinally by engaging the work and are thereby self-locking independently of auxiliary fastening devices.

3. A rotary cutting tool comprising a cylindrical member having a series of slotted openings extending in the periphery thereof, said openings being tapered radially of the member and longitudinally, and with the openings increasing in size toward the axis of said member and toward the outer end of said openings; and blades inserted in the openings having a size and shape to conform with said openings whereby each blade is locked in its respective opening by engagement with the adjacent portions of said member independently of fastening means.

4. A rotary cutting tool comprising a body member having a series of slots longitudinally arranged in the periphery thereof; cutter blades arranged in said slots, said slots and blades being tapered radially with the openings and blades increasing in size toward the axis of said member whereby said blades are radially locked therein by portions of said member independently of auxiliary locking devices and said openings and blades being tapered longitudinally with the openings and blades increasing in size toward the outer end whereby said blades are self locked by wedging longitudinally therein and whereby said blades may be caused to project further from the outer end to provide for wear by placing shims in said openings parallel therewith.

OLE SEVERSON.